Aug. 18, 1942.   N. T. BOURDAKOFF   2,293,106
METHOD AND APPARATUS FOR CREATING ILLUSIONS
Filed Feb. 8, 1940   5 Sheets-Sheet 1
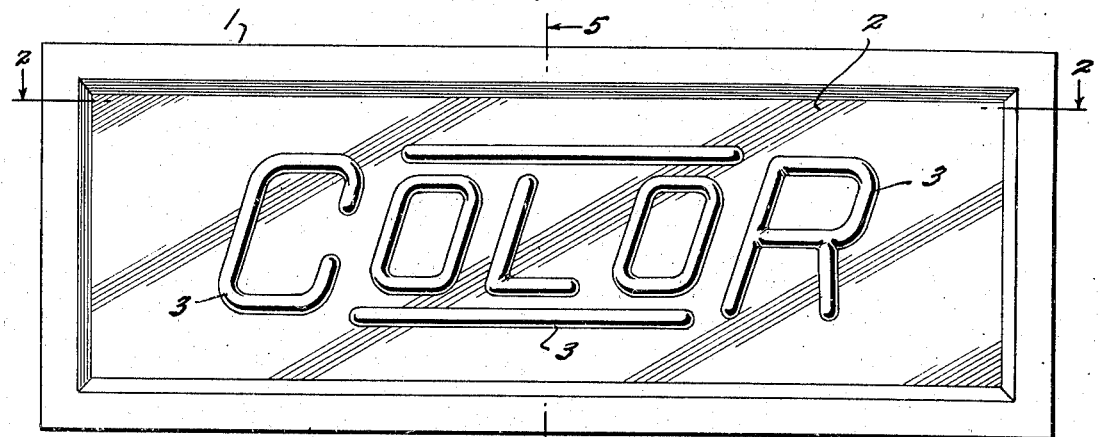
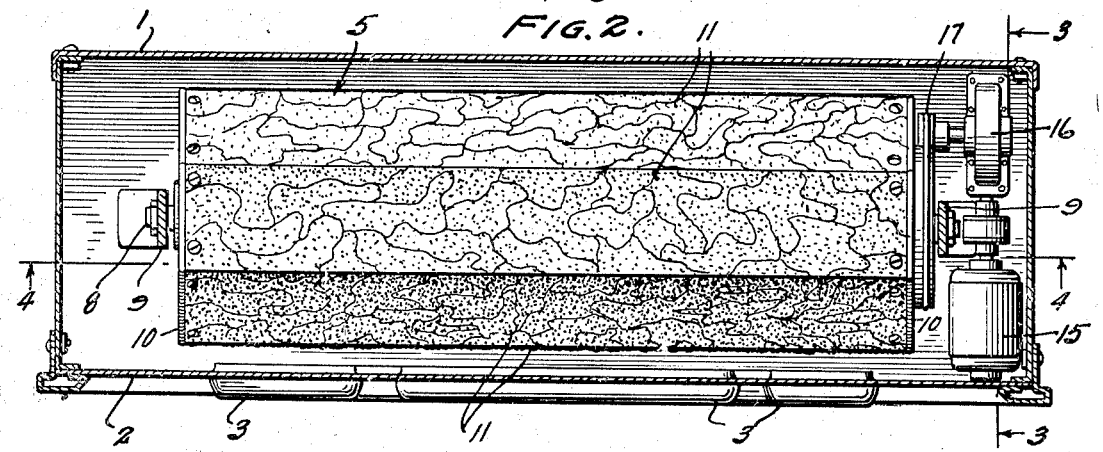
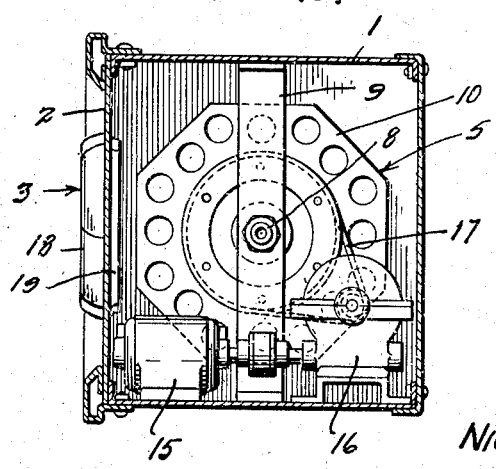
Inventor
NICOLAS T. BOURDAKOFF
By Semmes, Keegin & Semmes
Attorneys Aug. 18, 1942.   N. T. BOURDAKOFF   2,293,106
METHOD AND APPARATUS FOR CREATING ILLUSIONS
Filed Feb. 8, 1940   5 Sheets—Sheet 2
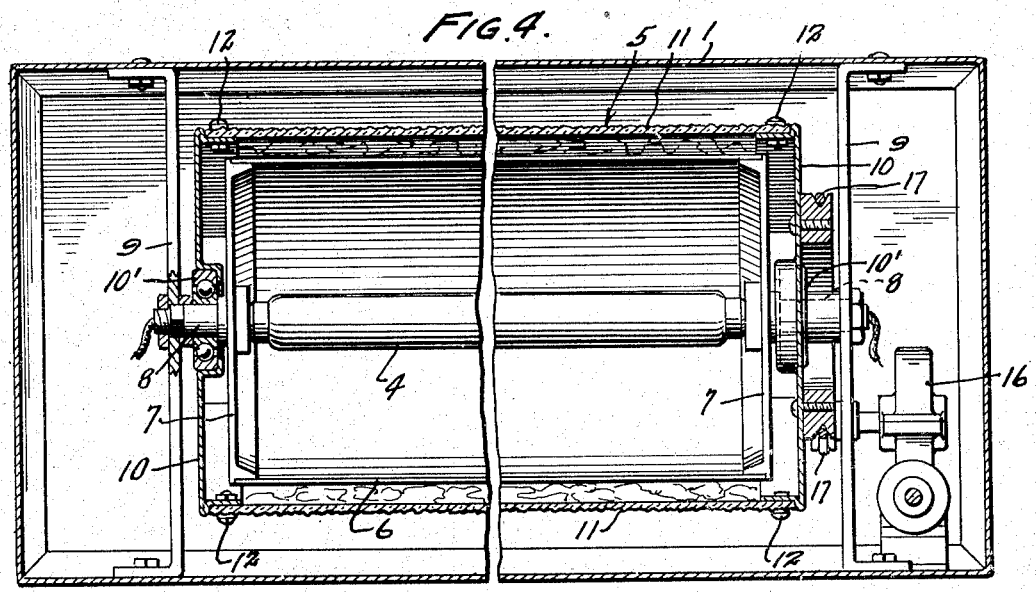
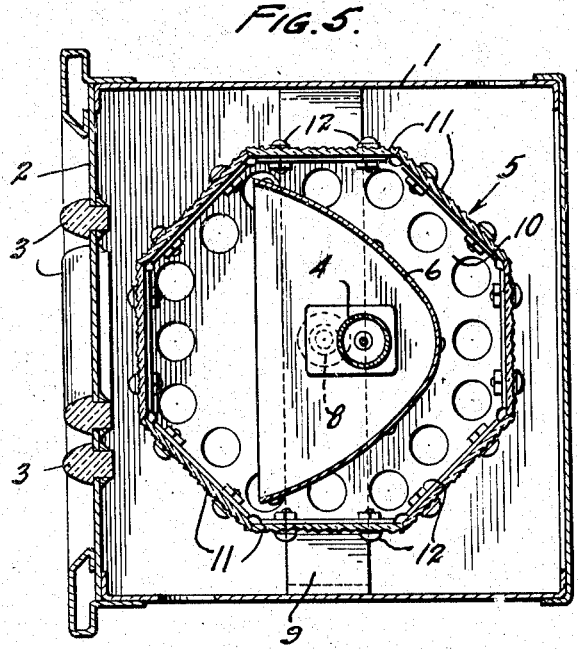
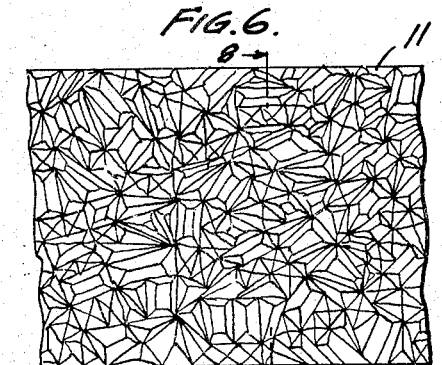
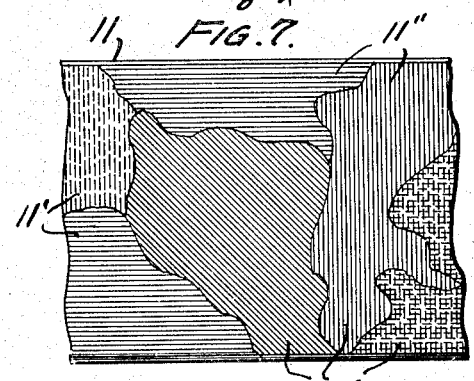
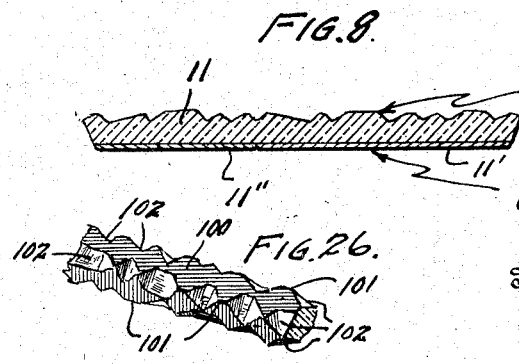
Inventor
NICOLAS T. BOURDAKOFF
By Semmes, Keegin & Semmes
Attorneys

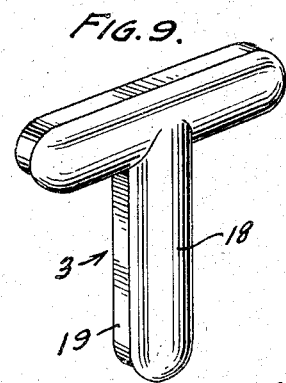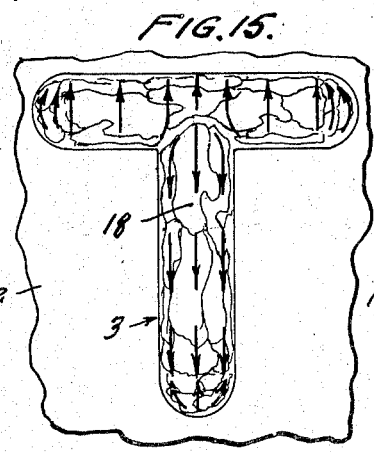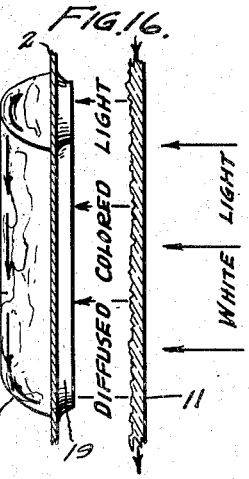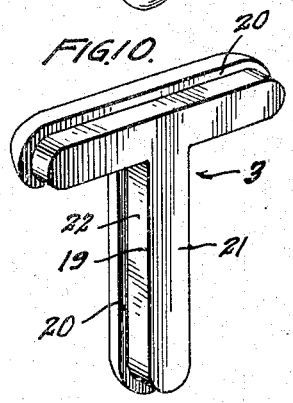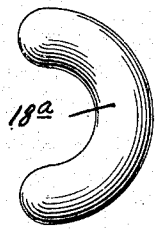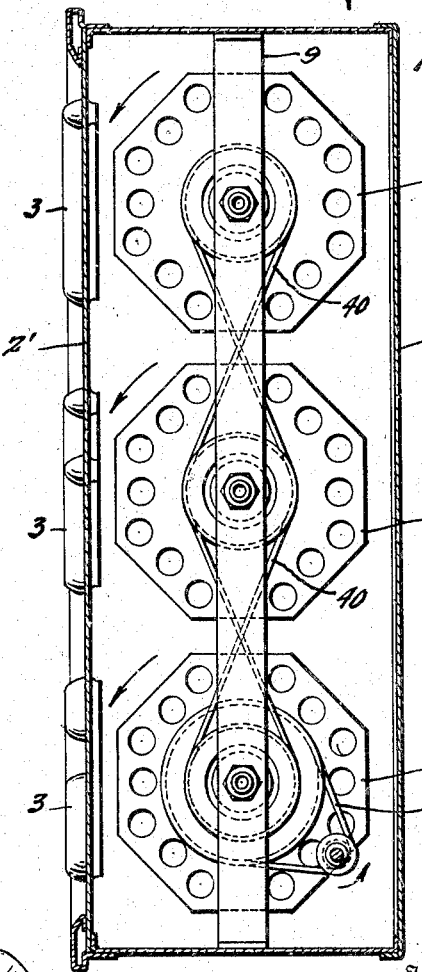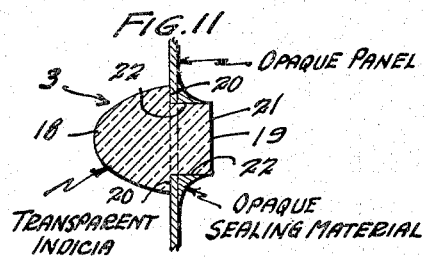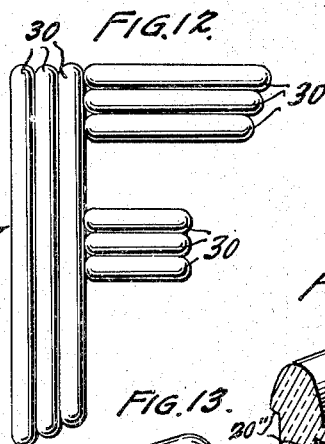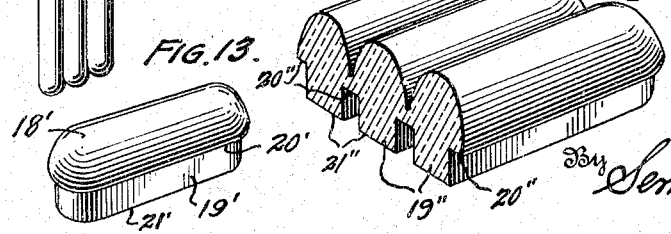

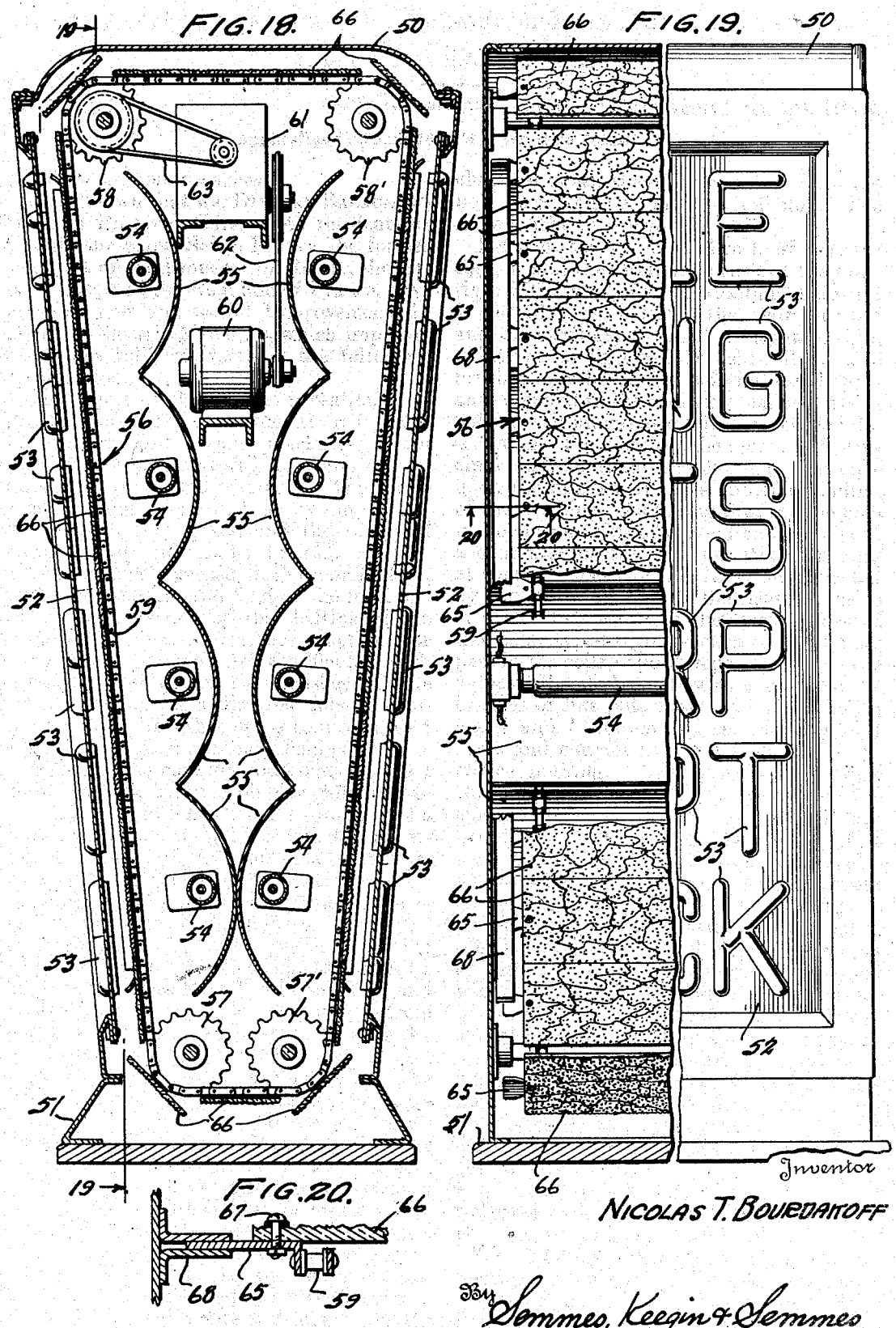

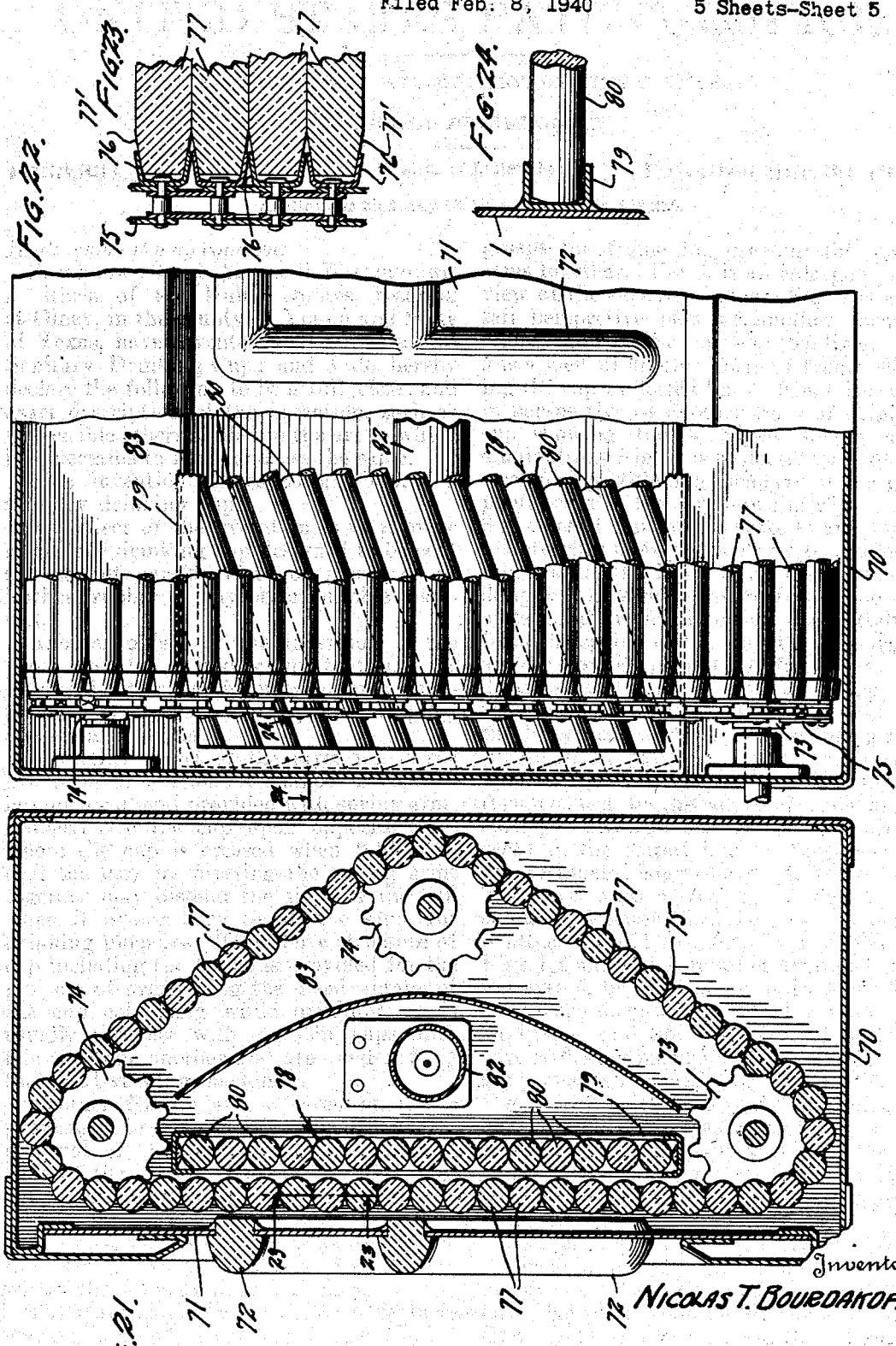

Patented Aug. 18, 1942

2,293,106

UNITED STATES PATENT OFFICE 2,293,106

METHOD AND APPARATUS FOR CREATING ILLUSIONS

Nicolas T. Bourdakoff, Dairen, China, assignor of twenty-five one-hundredths to S. S. Isaac, and thirty-five one-hundredths to James Albert Gray Application February 8, 1940, Serial No. 317,945

10 Claims. (Cl. 40—133)

The present invention relates generally to illuminated display devices and more particularly has reference to methods and apparatus for creating by means of illumination an illusion that appears to be a liquid flow of color. While in the drawings and description my invention has been applied to display signs or the like, it is of course of much broader application and can be employed to create numerous types of illusions.

I am well aware of the fact that multi-color display signs have been used in which the indicia or lettering changes in color. However, none of these prior signs will afford the visual effect that is accomplished by the present invention as will later become more readily apparent.

In these prior display devices there has been used a movable color curtain that was interposed between the indicia of the sign and the source of light so that as the color curtain moves the indicia will change in color. Various kinds of color curtains have been resorted to such as, for instance, a rotatable cylinder having splotches of colors provided on the outer periphery; screens composed of tubular colored rods or plates, and other similar assemblies. Additionally, some of the devices heretofore used have the advertising indicia or letters made up of lenses. However, the majority of these lenses have been so formed with respect to the sign panel that the source of illumination, color curtain, etc., can be seen through the lens, and consequently the desired illusion is completely destroyed.

An object of the present invention is to provide an illuminated display sign which simulates a liquid flow of color.

Another object of this invention is to provide an illuminated display sign, the indicia of which presents a liquid flow of color, and the elements that cause the illusion not being apparent upon viewing the sign.

A further object of this invention is to provide a novel lens of the so called plano-convex type.

Another object of this invention is to provide an illuminated display sign having an effect that will attract attention.

Yet a further object of this invention is to provide a display sign, the letters or indicia of which are made of lenses of such shape and so arranged in the sign that the liquid flow of color in the indicia appears to be moving in different directions.

And still a further object of this invention is to provide an illuminated display sign that simulates a liquid flow of color and in which the direction of the liquid flow can be regulated.

A further object of the present invention is to provide a novel lens of the type described which can be employed for numerous purposes such as providing moving pictorial effects in color, lighting radio dials, automobile tags, etc.

To achieve the foregoing and further objects, my invention in general comprises interposing between a source of illumination and an opaque panel having therein lenses that constitute the sign indicia, a color screen or curtain made up of multi-colored glass members. The curtain or screen is adapted to be moved so that the color of the indicia will be constantly changing and as a consequence attract the attention of persons moving past the display device. The lens and the movable color screen are of such character so that a liquid flow of color appears to be moving in different directions in the indicia.

In certain forms of my invention the letters forming the indicia can be made of a single lens; and in other forms it has been found advantageous to make the letters of a plurality of individual lenses.

In certain instances the color screen can take the form of a rotatable drum, the outer periphery of which comprises a plurality of glass bars having splotches or the like of transparent paint appearing on at least one of the surfaces thereof. In other instances it has been found most practical to provide a plurality of super-imposed drums of the type just referred to.

Another form of color screen which is highly effective is a movable chain which carries plates of multi-colored glass. In addition, a very interesting effect is accomplished by positioning a stationary screen of rods of glass or the like between the source of illumination and the movable color curtain.

In all of the above described arrangements the appearance of the indicia of the sign is that of a liquid flow of color. At this time it should be pointed out that while in the preferred embodiments of my inventive concept the liquid flow appears to be one of numerous different colors, it is of course obvious that the flow can be but a single color.

In the drawings in which like numerals indicate the same or similar parts:

Figure 1 is a front elevational view of my invention.

Figure 2 is a sectional view taken along line 2—2 of Figure 1 looking in the direction of the arrows.

Figure 3 is a sectional view taken along the line 3—3 of Figure 2 looking in the direction of the arrows.

Figure 4 is a sectional view taken along the line 4—4 of Figure 3 looking in the direction of the arrows.

Figure 5 is a sectional view taken along the line 5—5 of Figure 1 looking in the direction of the arrows.

Figure 6 is a fragmental detail view of the top of one of the plates of glass consisting the color drum.

Figure 7 is a fragmental detail view of the lower side of one of the plates of glass constituting the drum showing the manner in which the transparent coloring material is disposed on the plate.

Figure 8 is a sectional view taken along the line 8—8 of Figure 6 looking in the direction of the arrows.

Figure 9 is a view in perspective of the front of one of the lenses which constitutes the display indicia.

Figure 10 is a view in perspective showing the rear of the indicia illustrated in Figure 9.

Figure 11 is a side elevational view in section showing the manner in which the display indicia or character is positioned and retained in the panel piece of the sign.

Figure 12 is a front elevational view of a modified type of character that can be employed.

Figure 13 is a view in perspective of a lens which is employed to make up a display character such as that shown in Figure 12.

Figure 14 is a view in perspective of still a further type of lens that can be used to form the necessary indicia.

Figure 15 is a front elevational view of the transparent character shown in Figure 9 in which the arrows indicate the movement or flow of color in the character.

Figure 16 is a view in side elevation, partly in section, of the character shown in Figure 15, the arrows indicating the direction of the flow of color in the character.

Figure 17 is a vertical transverse sectional view of a modified form of display device.

Figure 18 is a vertical transverse sectional view of still a further form of display device that can be used in which the movable color screen is carried by a chain or the like.

Figure 19 is a sectional view taken along the line 19—19 of Figure 18 looking in the direction of the arrows.

Figure 20 is a sectional view taken along the line 20—20 of Figure 19 looking in the direction of the arrows.

Figure 21 is a vertical transverse sectional view of a further modified form of my display sign.

Figure 22 is a fragmental front elevational view, partly broken away, of the display device shown in Figure 21.

Figure 23 is a sectional view taken along the line 23—23 of Figure 21 looking in the direction of the arrows.

Figure 24 is a sectional view taken along the line 24—24 of Figure 22 looking in the direction of the arrows.

Figure 25 is a face view of a curved type of character that can be used.

Figure 26 is a view in perspective of a modified form of my light diffusing member to be used in the color screen.

In the construction shown in Figure 1, there is provided a casing 1 having a front panel piece 2 which has associated therewith display indicia 3.

The casing 1 is preferably made of metal, wood or the like, and in any event it is necessary that the panel piece 2 be of a material of this character, the purpose of which will hereinafter be more fully discussed. Mounted within the casing 1 is a source of illumination 4 around which is adapted to rotate a color drum 5. Positioned within the drum 5 around the light source 4 is a reflector 6, each end wall 7 of which is attached to a stub shaft 8 fixed in vertical supports 9 mounted within the casing 1.

It can be seen in Figures 3 and 4 that ends 10 of the drum 5 carry ball bearings 10' which permit the ends to rotate around each of the stub shafts 8. Mounted on the outer periphery of the ends 10 are a plurality of plates of glass 11, and each extremity of the plate is attached to its respective end as indicated at 12 in Figure 5. It will be noted in Figures 6 and 8 that the plates 11 are of the type known as pebbled glass so that the drum can have a light diffusing outer surface. The inner surface of each plate is painted with a transparent coloring material, and in this particular instance the plate is painted with splotches of different colors as shown by 11' in Figure 7. Of course the inner surface of the plate glass 11 can be painted of a solid color if desired. In this connection, I would like to point out that while the drum is shown as being of octagonal configuration other shapes can be used. Also, it is within the scope of my invention to employ materials other than glass for the color drum. I have found it feasible to employ certain transparent and translucent plastics, such as, "Bakelite," "Lucite," or the like.

As previously pointed out, the color drum 5 is adapted to be rotated, and for this purpose it will be seen that the drum is driven through motor 15, reduction gear 16 and belt 17. This last mentioned layout is so constructed that the speed of the drum can be regulated and if necessary the direction of movement of the drum can be automatically reversed.

The panel piece 2 has cut therein apertures which correspond to the letter or letters that are to appear in the sign, and the indicia 3 is then inserted into the cut-out portion. Attention is called to Figures 9 to 11 inclusive wherein there is illustrated in detail the construction of the indicia 3.

The indicia comprises a transparent character having a lens 18 of plano-convex cross section provided with an integral projection 19 extending from the plane surface. The inner sides of the lens 18 are flat to afford shoulders 20 and the lower surface 21 of the projection is parallel to the plane surface of the lens. In addition, sides 22 of the projection 19 are spaced inwardly from the outer edges of the plane surface of the lens. It can be seen that the lens is of short focal length and this will enable the direction of flow of color in the lens to be regulated.

As clearly shown in Figure 11, the extension 19 is positioned in the aperture cut out in the panel piece 2 and the shoulders 20 lie flush with the outer surface of the panel. The sides 22 of the extension are then covered with an opaque sealing material so that the lens will be held in proper position in the panel piece and the entire portion of the extension 19, with the exception of the plane surface 21, is painted with an opaque material, preferably black paint. Consequently, the non-design area of the panel piece 2 is opaque and only the indicia is transparent.

In Figure 12, I have shown a transparent character being made up of individual elongated plano-convex lenses 30. Each lens is of substantially the same construction as that described in connection with Figure 11 and in Figure 13 I use the same reference characters with the exception that they are primed. This particular type of lens affords a very interesting effect and finds particular application in cases where it is desired to make large letters. However, instead of having but a single elongated lens, it is possible to mold together, for instance, a plurality of lenses such as shown in Figure 14.

In Figure 25, I have shown a lens of curved configuration that can be used for forming letters or characters such as, B, O and S, or the like. Consequently, this particular form of lens will enable letters having curved portions to be more readily formed. It is understood of course that various other types of curved lenses can be made without departing from the essence of my invention.

The lenses can be made of glass or various transparent plastic materials, such as, "Lucite."

In operation, when the drum 5 rotates, light from the source of illumination 4 is directed by reflector 6 through the multi-colored diffusing plates 11 on the outer periphery of the drum into the lens 18 through the plane surface 21 of the projection 19. When the drum is moving as shown in Figure 16, the movement of color in the vertical portion of the display character is in a downward direction as indicated by the arrows by reason of the short focal length of the lenses. At the bottom of the vertical portion, however, the flow of color appears to be upward and in the horizontal portion of the character the flow is upward as shown by the arrows and at the ends of the horizontal portion the color appears to be flowing back into the casing.

With the particular type of drum that I have shown, that is, one having a pebbled glass outer periphery with a transparent coloring substance on the inner face of the glass and my novel short focal length lens, there is provided a viscous liquid flow of color in the transparent character. In all vertical portions of the character, the flow of color moves downwardly and in the horizontal portions the flow moves upwardly. While I have not specifically shown a character having a portion thereof extending diagonally, the flow of color in such a character appears to move diagonally across.

Consequently, with my invention it is possible by proper positioning of the lenses in the panel piece to regulate the direction in which the liquid flow of color will move. At this time, I might also point out that I have found through much experimentation that a lens of parabolic section affords the best visual effects. I have found that better effects are provided with a parabolic face that is relatively thick. In addition, the effects are also improved when the shank of the lens is relatively long. Of course the proper thicknesses can be determined by a person skilled in the art.

Also, it is possible to use in lieu of the pebbled glass 11, plain glass such as window pane glass, although I have found that such glass will not give the effect of a thick liquid flow, but rather a water flow.

Very interesting visual effects can be had when the transparent character is made up of individual lenses such as illustrated in Figures 13 and 25. For instance, part of the horizontal member of the letter T could be made of vertically disposed lenses, part of horizontally placed lenses and the remainder of diagonally disposed lenses. The vertical member could be made in the same manner. As a result, some of the flow of color in the horizontal member would appear to be moving upwardly, some downwardly, and some diagonally; a similar movement would be present in the vertical member of the character. The above illustration is merely one of the innumerable types of transparent characters that can be formed to provide a display device having my novel visual effect. Obviously, by the proper positioning of the lens many novel effects are possible.

It should also be mentioned that a lens of the configuration described presents no dark spots or streaks, and I experienced much difficulty in an endeavor to devise a lens which would give the desired effect without having such dark portions. I found that a prism-like lens or lens circular in cross section possessed these disadvantageous characteristics, and as a matter of fact, the only lenses which would provide the desired visual effect are those herein illustrated.

In Figure 17, I have shown a somewhat modified form of my invention which is generally similar to that illustrated in Figure 1. In this form, however, it will be observed that the casing 1' is higher than that shown in Figure 1. This particular form is for a rather large sign, and as a consequence instead of utilizing a single drum, I employ a plurality of superimposed drums 5', in this case three. The drums are driven in the same manner as the single drum 5 shown in Figure 1, with the exception that there are provided belts 40 for transmitting rotary movement from the lower drum 5' to the upper drums. It can be readily ascertained that the middle drum 5' is rotating in a direction opposite to that of the upper and lower drums. As before stated, this embodiment finds particular application in the case of rather large signs, especially those that are of some height.

In Figures 18 and 19, there is illustrated a further form of my basic idea in which a movable color screen is employed in lieu of the rotatable drum or cylinder. In this construction I provide a casing 50 having a base 51. The casing 50 has two panel pieces 52 so that the sign can be visible from both the front and back. As was the case of the casing 1, the casing 50 and the panel pieces 52 are made of an opaque material, preferably metal or wood. It will be seen that the panel pieces 52 extend upwardly from the base 51 at a slight angle from the vertical, and this will enable the indicia to be more visible when the sign is in place, and it should be pointed out that this particular form is for a sign that is to be positioned at a rather high elevation.

The panel piece 52 is provided with apertures in which transparent characters 53 are positioned, and these characters can be of the same construction as those previously described.

Mounted within the casing 50 are a plurality of pairs of sources of light 54 having associated therewith reflectors 55. Positioned between the sources of light 54 and the panel pieces 52 is a movable color screen indicated generally 56.

Mounted in the lower portion of the casing 50 are pairs of idle sprockets 57 and 57', and carried in the upper portion of the casing are other pairs of sprockets 58 and 58'. A pair of endless chains 59 engage the sprockets 57—57' and 58—58'. To transmit movement to the chains 59, I provide the following arrangement. A motor 60 is associated with reduction gear 61 through belt drive 62. The reduction gear 61 in turn drives the sprocket 58 through a second belt 63. Consequently, when the motor 60 is operating, the chains 59 will be moved by virtue of the gear train described.

In Figure 20, it will be noted that one of the links of the chain 59 carries a right angled extension 65. A plate of pebbled glass 66 similar to plate 11 is attached to the extension near its lateral edge by a bolt or the like 67. In order to hold the plate 66 in proper position during movement of the chain, the side walls of the casing 50 are provided with guide channels 68 into which the extension 65 extends. By virtue of the manner of attachment of each plate 66 to the chain 59, there can be no binding of the plates as they move around the sprockets, nor is there any danger of the plates becoming broken.

The operation and the visual effect of the sign shown in Figures 18 and 19 are substantially the same as those mentioned in connection with Figure 1.

With reference to Figures 21 to 24 inclusive, I have illustrated a still further modification of my invention and in this embodiment I provide a casing 70 having front panel plate 71 and transparent indicia 72 carried by the panel plate. The casing 70 and panel plate 71 are formed of metal or other suitable opaque material and the transparent indicia 72 are similar to the indicia 3.

Mounted within the casing 70 and movable about a driven sprocket 73 and pairs of idle sprockets 74 suitably journaled within the casing are chains 75. As clearly indicated in Figure 23, the inner links of the chains carry cup-like members 76. Glass rods 77 having tapered ends 77' are positioned in the cup-shaped members. The rods are painted with a transparent coloring medium. As will be seen in Figure 23, the tapered ends 77' of the rods 77 permit them to abut one another, thus preventing transmission of white light to the indicia 72. Consequently, chains 75 and the colored rods 77 provide the movable color screen. While I have not shown any means for imparting movement to the chain 75, a motor and gear train such as that illustrated in Figures 18 and 19 can be employed.

In Figure 21, it will be seen that a stationary screen designated generally 78 is positioned rearwardly of the movable color screen. This stationary member comprises a channel shaped frame 79 that is suitably attached to the side walls of the casing 70. Mounted within the frame 79 are a plurality of transparent glass rods or the like 80 which are preferably mounted in the frame at an acute angle to the movable rods 77, as shown in Figure 22. While I have shown the glass rods 80 as being disposed at an angle inclining upwardly from the horizontal, it is of course to be understood that these rods can be mounted at various different angles, depending upon the particular effect that is sought. As was the case of the rods 77 of the color screen, the rods 80 are so arranged that no unrefracted light can traverse the screen.

While the drawings show the rods 77 and 80 being of circular cross section, it is to be understood that they may be oval, half round, hexagonal, or of any other desired section.

Mounted within the casing 70 behind the stationary screen 78 is a source of illumination 82 provided with a reflector 83 so that the light from the source of illumination will be directed through the screens.

This particular embodiment, while presenting a liquid flow of color in the lenses 72 when the chains 75 and rods 77 are in motion, in addition by virtue of the stationary glass rods arranged at an angle, give the effect of a constantly rippling flow of color across the transparent characters. The movement of color across the characters can of course be varied by positioning the glass rods 80 at various different angles whereby a sign having a great latitude of visual effects is afforded.

It should be stressed at this time that each plate or rod constituting the color curtain is so disposed with respect to the others that there is no danger of white light being visible in the indicia. It is known that when slits are intermediate the plates or rods, and the color curtain moves, a flickering effect is present in the display character and obviously the desired liquid flow is lost.

In Figure 26, I have shown another type of light diffusing member that can be used in the color screen. It will be noted that a relatively narrow strip of glass or the like, 100, is chipped at its angular edges, 101, as indicated at 102. This particular diffusing member when used in combination with my novel lens affords most satisfactory visual effects. When these individual strips 100 are disposed side by side care should be exercised that no white light can traverse the color screen.

In the drawings, I have shown the movable color screens being supported by chains, but various other mechanical expedients, such as belts, bands or the like may be used.

With further reference to the lenses for forming the transparent characters, it should be stressed that in all areas of the character which are parallel to the axis of rotation of the color curtain, the flow of color is in a direction opposite to the movement of the color curtain. In those areas of the character which are perpendicular to the axis of movement of the curtain the flow is in the same direction and in the areas that are at an angle to the axis of movement, the color appears to move diagonally across the character.

In characters having curved lines, that is, "U" or "O", the flow of the color downwardly in the vertical portions seem to run together in the bottom portion and flow into the interior of the panel piece.

Also in letters such as, for example, "R", the upward flow of color in the horizontal member at the point where it joins the vertical portion appears to flow into and move with the downwardly moving body of color in the vertical portion.

Another important feature of my invention is that by having the extension 19 of the transparent character painted opaque will prevent the colors on adjoining plates or the like of the color screen from being directed into the wrong lens and as a result will impair somewhat the movement of color in the lens. Consequently, by having the projection of the lens painted with an opaque substance, I will always get pure color in the individual transparent characters without interference from the other color splotches.

From the foregoing description, it will be appreciated that I have provided a display device that will present by means of illumination a sign in the indicia of which a flow of liquid color appears to be moving in different directions. Furthermore, with my device, it is possible to regulate the direction in which this liquid flow of color will move, consequently providing a sign that will present very unusual visual effects and attract the attention of passers by. Another very important characteristic of my display device is that it is not possible upon viewing transparent characters on the panel front to see the elements that constitute my display device, and as a result destroy the illusion of a liquid flow of color.

Moreover, my novel lens of the plano-convex type has in addition to the specific use set forth in the application, additional uses such as, affording in color various moving pictorial effects, in radio dials, house numbers, automobile license tags, etc.

It is believed somewhat obvious that the device consists of few essential working parts and as a consequence can be quite cheaply and easily manufactured. By virtue of its structural simplicity, it is a relatively simple matter to repair or replace any of the elements that may become damaged.

While I have shown and described the preferred embodiment of my invention, I wish it to be understood that I do not confine myself to the precise details herein set forth by way of illustration, as it is apparent that many changes and variations may be made therein, by those skilled in the art, without departing from the spirit of the invention, or exceeding the scope of the appended claims.

I claim:

1. In a display device of the character described, a source of illumination, an opaque panel having cutout display matter, elongated lenses of parabolic cross section having a short focal length inserted in the cutout portions, said lenses having vertical portions and horizontal portions, and a color curtain interposed between the lenses and the source of illumination and movable about a horizontal axis whereby a liquid flow of color moves in a downward direction in the vertical portions of the lenses and in an upward direction in the horizontal portions of the lenses when movement is imparted to said color curtain.

2. In a display device of the character described, a source of illumination, an opaque panel having cutout display matter, elongated lenses of parabolic cross section having a short focal length inserted in the cutout portions, said lenses having vertical portions and horizontal portions, and a rotatable color drum interposed between the lenses and the source of illumination and movable about a horizontal axis whereby a liquid flow of color moves in a downward direction in the vertical portions of the lenses and in an upward direction in the horizontal portions of the lenses when movement is imparted to said rotatable color drum.

3. In a display device of the character described, a casing, a source of illumination therein, at least one wall of said casing being provided with an opaque panel having cutout display matter, elongated lenses of parabolic cross section inserted in said cutout portions, said lenses having vertical portions and horizontal portions, a movable drum positioned around the source of illumination, plates of pebbled glass carried by the drum, a transparent coloring substance provided on at least one face of said pebbled glass, and power means to rotate said drum whereby a liquid flow of color goes in a downward direction in the vertical portions of the lenses and in an upward direction in the horizontal portions of the lenses.

4. In a display device of the character described, a source of illumination, an opaque panel having cutout display matter, elongated lenses of parabolic cross section inserted in the cutout portions, said lenses having vertical portions and horizontal portions, a movable color curtain positioned between the opaque panel and the source of illumination comprising transparent pebbled colored plates, movable chains having devices for securing the plates thereto, and means to move the chains whereby a liquid flow of color moves in a downward direction in the vertical portions of the lenses and in an upward direction in the horizontal portions of the lenses.

5. In a display device of the character described, a source of illumination, an opaque panel having cutout display matter, a rotatable color curtain disposed between the opaque panel and the source of illumination, elongated lenses of parabolic cross section having a short focal length inserted in the cutout portions, the said lenses having portions whose axes are in a plane parallel to the axis of the rotating color curtain, and other portions whose axes are in a plane perpendicular to the axis of the rotating color curtain, and means to rotate said color curtain whereby the color in those portions which are in a plane parallel to the axis of the rotating color curtain flows in an opposite direction to the rotation of the color curtain and the color in those portions whose axes are in a plane perpendicular to the axis of the color curtain moves in the same direction as the rotation of the color curtain.

6. In a display device of the character described, a source of illumination, an opaque panel having cutout display matter, a rotatable color drum interposed between the opaque panel and the source of illumination, elongated lenses of parabolic cross section having a focal length inserted in said cutout portions, the said lenses having portions whose axes are in a plane parallel to the axes of the rotating color drum, and other portions whose axes are in a plane perpendicular to the axis of the rotating color drum, and power means to impart rotary movement to said drum whereby a flow of liquid color moves in an opposite direction to the movement of the drum in those portions whose axes are in a plane parallel to the axis of the drum and in the same direction as the movement of the drum in those portions whose axes are perpendicular to the axis of the color drum.

7. In a display device of the character described, a source of illumination, an opaque panel having cutout display matter, elongated lenses of parabolic cross section having a short focal length inserted in the cutout portions, said lenses provided with vertical and horizontal portions and having a plane face opposite to the parabolic face, and a color curtain interposed between the plane face of said elongated lenses and the source of illumination and movable about a horizontal axis whereby a liquid flow of color moves in a downward direction in the vertical portions of the lenses and in an upward direction in the horizontal portions of the lenses when movement is imparted to said color curtain.

8. A display sign comprising a source of light, an opaque panel having cutout display matter, elongated lenses of parabolic cross section having a short focal length inserted in the cutout portions, said lenses having vertical portions and horizontal portions, a movable color screen positioned between the lenses and the source of light, a stationary screen disposed between the source of light and the movable color screen comprising a plurality of transparent deflecting rod members disposed at an angle with respect to the movable color screen, and means to move said color screen whereby a liquid flow of rippling color goes in a downward direction in the vertical portions of the lenses and in an upward direction in the horizontal portions of the lenses.

9. In a display device of the character described, an opaque panel having cutout display matter, elongated lenses of parabolic cross section having a short focal length inserted in the cutout portions, the said lenses provided with vertical portions and horizontal portions and having a plane face opposite to the parabolic face, a movable color curtain positioned between the plane face of said elongated lenses and the source of illumination comprising transparent colored plates, movable chains having devices for securing the plates thereto and means to move the chains whereby a liquid flow of color moves in a downward direction in the vertical portions of the lenses and in an upward direction in the horizontal portions of the lenses.

10. In a display device of the character described, a source of illumination, an opaque panel having cutout display matter, a movable color curtain positioned between the opaque panel and the source of illumination, elongated lenses of parabolic cross section having a short focal length inserted in the cutout portions, said lenses having portions whose axes are in a plane parallel to the axis of the color curtain, and other portions whose axes are in a plane perpendicular to the axis of the color curtain, the said color curtain comprising transparent colored plates, movable supports having devices for securing the plates thereto, and means to move the supports whereby a liquid flow of color moves in an opposite direction to the movement of the color screen in those portions whose axes are in a plane parallel to the axis of the color curtain and in the same direction as the movement of the color screen in those portions whose axes are in a plane perpendicular to the axis of the color curtain.

NICOLAS T. BOURDAKOFF.